United States Patent
Rajagopalan

(10) Patent No.: US 7,135,239 B2
(45) Date of Patent: Nov. 14, 2006

(54) COMPOSITE MATERIAL MADE OF HIGH-STRENGTH ALUMINUM ALLOY

(75) Inventor: Rahul Rajagopalan, Aachen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/174,930

(22) Filed: Jul. 5, 2005

(65) Prior Publication Data

US 2006/0003181 A1   Jan. 5, 2006

(30) Foreign Application Priority Data

Jul. 5, 2004   (DE) ..................... 10 2004 033 457

(51) Int. Cl.
*B32B 15/04* (2006.01)
*B32B 15/20* (2006.01)
*F16L 9/14* (2006.01)
*F28F 1/00* (2006.01)
*F28F 21/08* (2006.01)

(52) U.S. Cl. ..................... 428/654; 428/686; 165/180; 138/143; 138/145

(58) Field of Classification Search ................ 428/650, 428/654, 686, 933; 165/177, 180, 905, 134.1; 138/140, 141, 142, 143, 145, 146; 420/528, 420/548; 148/415, 416
See application file for complete search history.

(56) References Cited

U.S. PATENT DOCUMENTS

| | | | | |
|---|---|---|---|---|
| 5,292,595 A | | 3/1994 | Yamauchi et al. | 428/654 |
| 5,356,725 A | * | 10/1994 | Eichhorn et al. | 428/654 |
| 6,316,126 B1 | | 11/2001 | Hasegawa et al. | 428/654 |
| 6,361,882 B1 | | 3/2002 | Shoji et al. | 428/654 |
| 2002/0142185 A1 | | 10/2002 | Kilmer | 428/654 |

FOREIGN PATENT DOCUMENTS

| | | |
|---|---|---|
| DE | 1 938 316 | 5/1966 |
| DE | 24 39 668 | 3/1975 |
| DE | 28 18 564 A1 | 11/1978 |
| DE | 31 27 980 C2 | 4/1982 |

* cited by examiner

*Primary Examiner*—Michael E. La Villa
(74) *Attorney, Agent, or Firm*—Brinks Hofer Gilson & Lione

(57) ABSTRACT

A composite material made of a high-strength aluminum alloy. The composite material is particularly used for the production of brazed heat exchangers for vehicles. The composite material includes a core layer, a corrosion protective layer covering the top surface of this core layer and a brazing material layer applied to the corrosion protective layer, all with specifically selected alloying constituents.

16 Claims, 2 Drawing Sheets

COMPOSITE MATERIAL MADE OF HIGH-STRENGTH ALUMINUM ALLOY

BACKGROUND

1. Field of the Invention

The invention relates to a composite material made of a high-strength aluminium alloy, and more particularly to a composite material used for the production of brazed heat exchangers used in vehicles.

2. Related Technology

Development of high-strength aluminium alloys is forced by the demand of the vehicle industry to manufacture lighter and thinner-walled materials.

While aluminium alloys or components made of aluminium alloys naturally have a good corrosion resistance, their mechanical strength is low. Adding alloying constituents such as magnesium (Mg) enhances, on the one hand, the mechanical strength of the alloy, but the corrosion resistance after brazing is problematic. Particularly aluminium alloys with magnesium contents of more than 0.3% and potassium aluminiumfluoride, e.g. NOCOLOK, is used as brazing material, considerable problems arise during brazing. Aluminium alloys with such a high magnesium content have a low corrosion protective potential due to the diffusion of some alloying constituents which have an electrochemical potential different from the matrix of the aluminium alloy.

When aluminium alloys are used for brazed structures such as heat exchangers, the brazing material has a cathodic effect on the aluminium alloy used as base material so that electrochemical corrosion is facilitated. Moreover, there is a risk for brazing materials containing silicon that the silicon intergranularly diffuses into the aluminium alloy, which results in grain boundary corrosion.

On principle, the corrosion risk of components made of an aluminium alloy depends on the alloying constituents, the production process, the site of use and the environmental conditions governing there.

From the state-of-the-art, different methods are used to increase the corrosion stability of aluminium alloys.

The addition of zinc can modify the brazing material so that it has an anodic effect. In this case the corrosion current flows from the more active coating material to the aluminium alloy. In time, the modified brazing material, however, acts as a sacrificial anode so that the aluminium alloy may corrode. On the other hand, a cathodically acting aluminium alloy is obtained when another element is added to the aluminium alloy as an alloying constituent. Moreover, the aluminium alloy used as base material can be improved in this way, in order to prevent the intergranular, or intercrystalline, respectively, diffusion of silicon.

DE 28 18 564 A1 discloses a method for corrosion protection of aluminium tubes for heat exchangers and correspondingly produced heat exchangers. A heat exchanger which is at least partly made of aluminium or an aluminium alloy is coated with a protective alloy. The protective alloy is, according to the patent filing data, an aluminium alloy containing up to 12% silicon.

US 2002/0142185 A1 discloses a 4-layer aluminium alloy for use in radiators. Two intermediate layers are provided which are used to enhance the brazing behaviour of the core layer. From these intermediate layers silicon can diffuse into the core layer in order to improve the strength of the core layer. It is a disadvantage of this invention that the core layer has low corrosion stability.

In DE 31 27 980 C2 a composite material for tubes of brazed heat exchangers and the use of this composite material are described. The composite material is a plated aluminium core alloy with the plating material consisting of pure aluminium, an aluminium-manganese alloy or an aluminium-silicon alloy with a copper content of 0.2% maximum. It is characteristic of this invention that the core alloy consists of 0.2 to 2% copper and aluminium and impurities as balance. In addition, the core alloy can contain 0.01 to 0.5% zirconium, 0.05 to 0.5% manganese and 0.05 to 0.5% chromium.

It is the object of this invention to provide a composite material, particularly for tubes of heat exchangers, which has a low mass, long life, high strength and high corrosion resistance.

SUMMARY

According to the invention, the problem is solved by that the composite material is structured of an aluminium alloy, and consists of a high-strength core layer, a corrosion protective layer covering this core layer and a brazing material layer applied to the corrosion protective layer.

In a preferred embodiment of the invention, in addition to the top surface also the bottom surface of the core layer is provided with a corrosion protective layer and brazing material layer placed thereon. Thus, the number of layers of the composite body which is coated on both sides increases to five layers compared to three layers of the composite body coated on one side only. The corrosion protective layer is applied to the core layer by a plating process or by coating.

The composite material can be structured as a plate-shaped or tube-shaped component or component of any shape.

The significant advantage of this invention is that due to the combination of functional layers the composite material can be configured to be, even after brazing, very light, high-strength and resistant to corrosion.

The significant advantages and features of the invention in its different aspects are excellent corrosion resistance and very high mechanical strength of the composite body due to the configuration in several layers; corrosion protection optionally applied to one or two sides, hence stability against internal and external corrosion attacks; further enhancement of the corrosion resistance of the composite body due to the difference of the corrosion protective potential between the anodic fluid transport element and the cathodic corrosion protective layer; and particularly suited under aggressive environmental conditions when salts such as NaCl and/or $CaCl_2$ or gases such as sulphur oxides $SO_x$ and/or nitrogen oxides $NO_x$ are present (danger of acid formation).

BRIEF DESCRIPTION OF THE DRAWINGS

Further characteristics and advantages of the invention will become readily apparent to persons skilled in the art after a review of the following detailed description of preferred embodiments with reference to the accompanying drawings of which shows.

DETAILED DESCRIPTION

Figure 1:
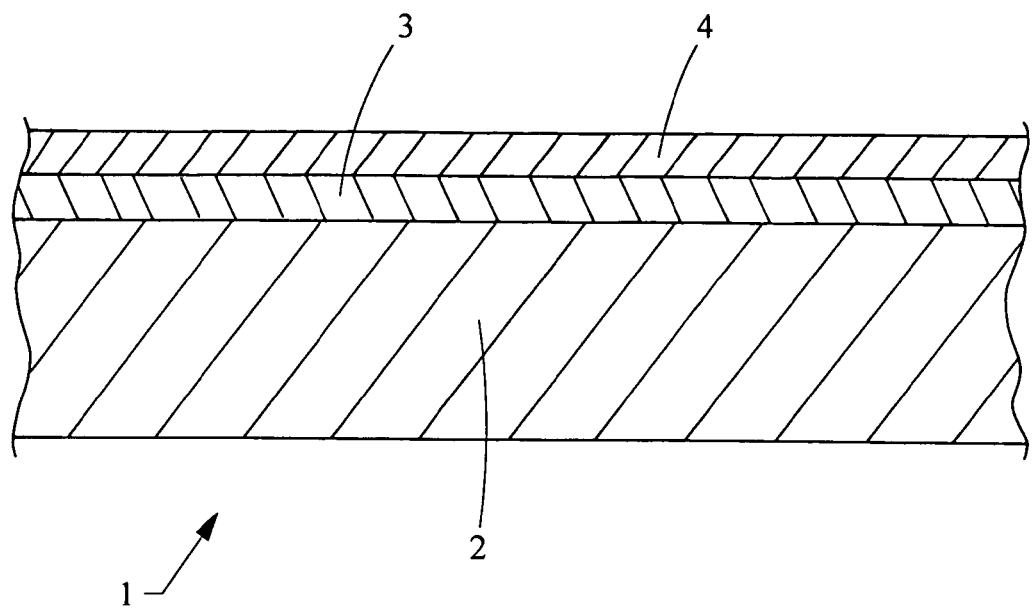
FIG. 1 is a schematic representation of the layered structure of a plate-shaped composite material of a first preferred embodiment in a cross-sectional view.

FIG. 1 illustrates a schematic representation of the layered structure of a plate-shaped composite material 1 of a first preferred embodiment of the invention. The core layer marked with the reference number 2 consists of a high-strength alloy with a low corrosion resistance. The core layer 2 essentially includes the metals aluminium Al, manganese Mn, magnesium Mg and copper Cu, as well as silicon Si of the main group A4. These alloying elements give the core layer 2 a desired brazing stability. The corrosion protective layer 3 applied to the upper surface of the core layer 2 protects the core layer 2 placed thereunder from corrosion, which is created by air humidity, e.g., or the like. Generally, a modified AA 3xxx-alloy with a life-long corrosion resistance is provided as a preferred alloy for the corrosion protective layer 3. The corrosion protective layer 3 is applied to the core layer 2 by plating or coating. When the plate-shaped composite material 1 is formed to a tube, the corrosion protective layer 3 is directed outwards. The deliberate selection and the associated proportions of alloying constituents to form this corrosion protective layer 3 contribute to make this corrosion protective layer 3 cathodic to the fluid transport element 5 indicated as anodic, in FIG. 3, of the composite material 1. A brazing material layer 4, according to the invention, with a low melting temperature is applied to the corrosion protective layer 3. This brazing material layer 4 is, generally, an Al—Si-alloy of the 4xxx series and used to braze the plating sheets.

Figure 2:
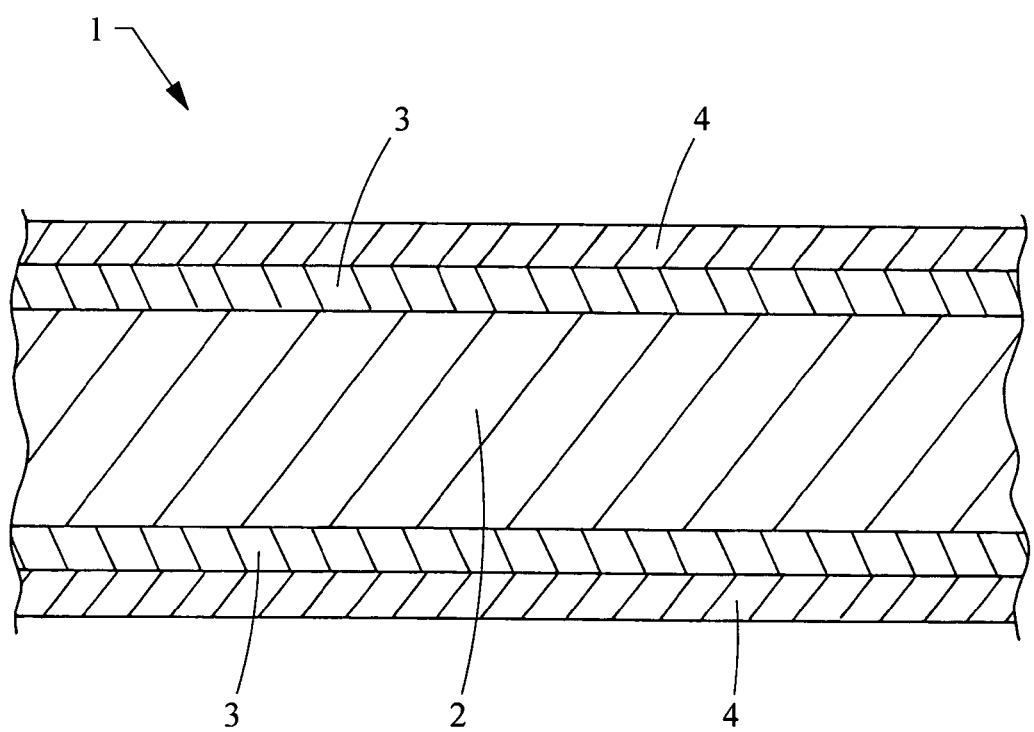
FIG. 2 is a schematic representation of the layered structure of a plate-shaped composite material of a second preferred embodiment in a cross-sectional view.

A schematic representation of the layered structure of a plate-shaped composite material 1 of a second preferred embodiment is illustrated in FIG. 2. Whereas the core layer 2 described above and shown in FIG. 1 is coated on one side only, i.e., on the top surface, in FIG. 2 both the top and bottom surfaces of the core layer 2 are provided with a corrosion protective layer 3 and a brazing material layer 4 in order to achieve an increased corrosion protection. The significant advantage of this double-sided coating consists in that now also the inner surface of a tube-shaped composite material 1 passed by a refrigerant is protected from corrosion, particularly in the area of the insert place of the fluid transport element 5 shown in FIG. 3. This two-sided coating, however, is not indispensable.

This composite material 1 is characterized by the following layered structure, from top to bottom: a brazing material layer 4, a corrosion protective layer 3, a core layer 2, a corrosion protective layer 3 and a brazing material layer 4.

The composite material's high-strength core layer, which consists of an aluminium alloy, has a lower corrosion resistance and essentially functions statically. The alloying constituents are provided to be 0.2 to 1.2% silicon Si; 0.8% maximum iron Fe; 0.15 to 1.0% copper Cu; 1.2% maximum manganese Mn; 1.2% maximum magnesium Mg; 0.04 to 0.35% chromium Cr; 0.2% maximum zinc; 0.25% maximum titanium Ti; and 0.3% maximum zirconium Zr.

The intermediate layer preferably applied to the core layer by plating is configured as corrosion protective layer and therefore protects the core layer beneath it. A long life alloy of the AA 3xxx series is provided as the preferred material for this corrosion protective layer. As the alloying constituents and the contents thereof in the aluminium alloy of the corrosion protective layer, 0.6% maximum silicon Si; 0.7% iron Fe; 0.10 to 0.3% copper Cu; 0.9 to 1.5% maximum manganese Mn; 0.15% maximum magnesium Mg; 0.2% maximum chromium Cr; 0.2% maximum zinc; 0.30% maximum titanium Ti; and 0.3% maximum zirconium Zr, are provided. The corrosion protective layer of the invention has an excellent corrosion stability to intergranular corrosion and pitting corrosion.

It has proved to be particularly advantageous that the thickness of the corrosion protective layer is between 5% and 20% and, preferably, between 5% and 15% of the thickness of the core layer.

The outer layer of the composite material is formed by a brazing material layer applied to the corrosion protective layer, whereby the brazing material layer, according to the invention, contains 5 to 15% silicon Si; 0.8% maximum iron Fe; 0.3% maximum copper Cu, 0.1% maximum manganese Mn; 0.05% maximum magnesium Mg; 0.5% maximum zinc Zn; and 0.20% maximum titanium Ti as alloying constituents. In order to ensure that the brazing material layer can be easily applied to the corrosion protective layer, the brazing material layer has a lower melting point than the corrosion protective layer and the core layer. The brazing material layer used is an aluminium-silicon alloy of the 4xxx series.

The calculated selection of the alloying constituents of the individual layers, namely the core layer, the corrosion protective layer and the brazing material layer, of the composite material according to the invention, a corrosion protective potential between the individual layers is created that also lasts after brazing. This corrosion protective potential is characterized in that the core layer is configured cathodic against the corrosion protective layer and the corrosion protective layer is configured also cathodic against the brazing material layer. Thus, the brazing material layer is anodic against the core layer.

The following matrix shows the alloying constituents in wt.-% of the individual layers, with layer 1 being the core layer, layer 2 being the corrosion protection layer, and layer 3 being the brazing material layer.

| wt.-% | Si | Fe | Cu | Mn | Mg | Cr | Zn | Ti | Zr |
|---|---|---|---|---|---|---|---|---|---|
| Layer 1 | 0.2–12 | max. 0.8 | 0.15–1.0 | max. 1.2 | max. 1.2 | 0.04–0.35 | max. 0.2 | max. 0.25 | max. 0.3 |
| Layer 2 | max. 0.6 | max. 0.7 | 0.10–0.3 | 0.9–1.5 | max. 0.15 | max. 0.20 | max. 0.2 | max. 0.30 | max. 0.3 |
| Layer 3 | 5.0–15 | max. 0.8 | max. 0.3 | max. 0.1 | max. 0.05 | / | max. 0.5 | max. 0.20 | / |

The addition of magnesium Mg increases the mechanical strength of the alloy, particularly the proof stress and the tensile strength. Adding of the nonmetal silicon Si and of the metal manganese Mn allows to further enhance the mechanical strength of the alloy.

The use of this composite material is not restricted to plate-shaped components, but it can also be used for tube-shaped components passed by a fluid or attacked by a fluid flow such as used, for example, in heat exchangers or transformers. The term heat exchanger or transformer is referred to the entirety of all apparatuses in which heat is exchanged. Typical heat exchangers or transformers are condensers, radiators, gas coolers, evaporators or general heating registers.

A plurality of tube-shaped composite materials according to the invention can therefore be summed up to a heat exchanger such as a $CO_2$-gas cooler used in the vehicle industry applicable with a refrigerant. The heat exchangers usually include a collector and a distributor, between which one or several fluid transport elements extend. The fluid transport element, which is anodic against the corrosion protective layer, is led through the tube wall and suitably aligned to be put into a collector and a distributor of the heat exchanger. Thus, the fluid transport element is in direct contact to the corrosion protective layer.

According to the invention, the difference of the corrosion potential is 20 mV to 40 mV between the cathodic corrosion protective layer and an anodic fluid transport element.

Figure 3:
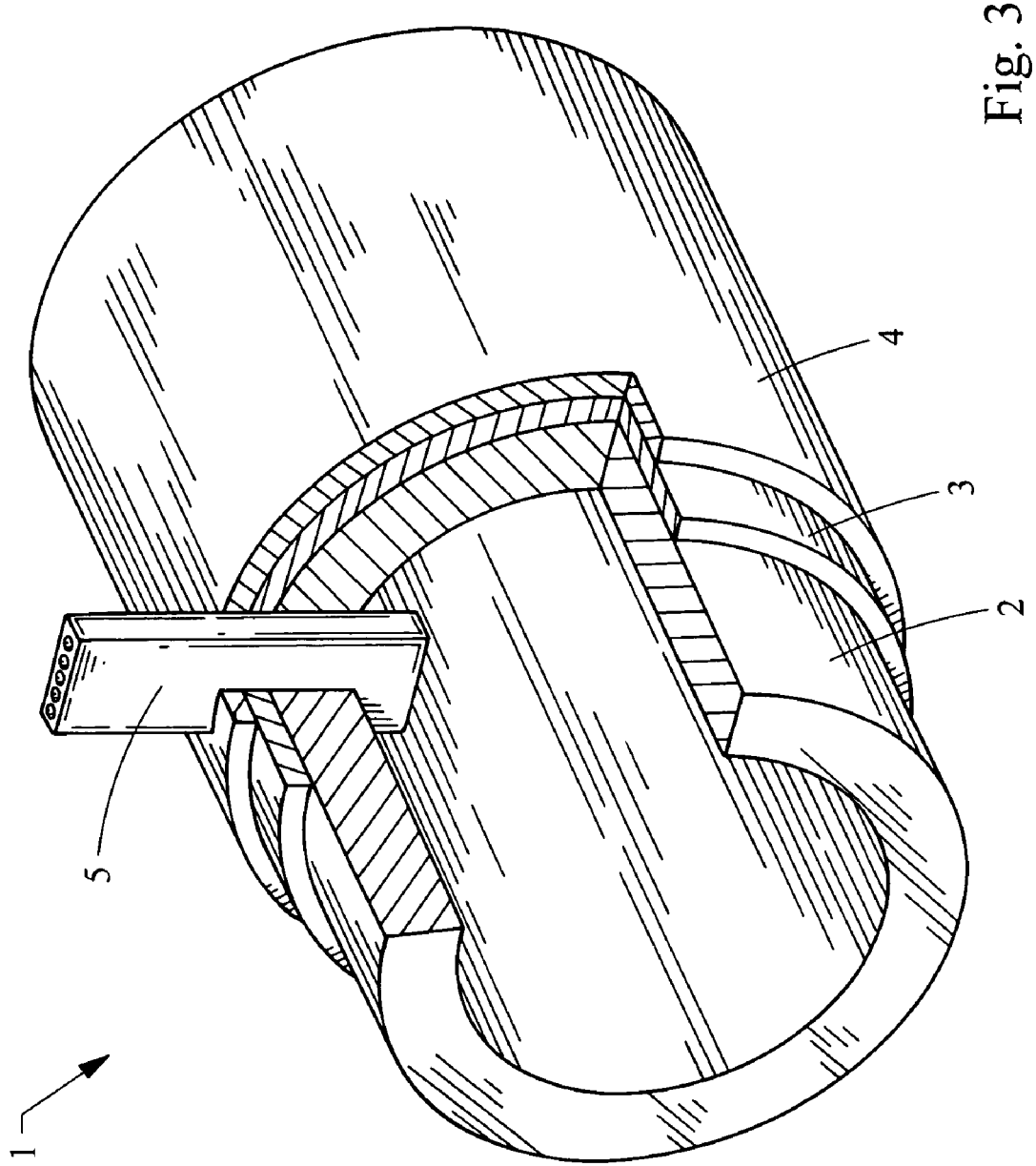
FIG. 3 is a perspective representation of the layered structure of a tube-shaped composite material of a first preferred embodiment configured as collector or distributor of a heat exchanger.

FIG. 3 shows a perspective representation of the layered structure of a composite material 1 of the first preferred embodiment configured as collector or distributor of a heat exchanger. As it is seen, the composite material 1 is shaped as a tube with the individual layers 2 to 4 configured as shells for clarity. The core layer 2 placed on the inner surface has, in this case, an approximately 5-fold thickness compared to the corrosion protective layer 3 applied to the core layer 2 by plating or coating. The outer cover of the composite material 1 is formed by a brazing material layer 4 of an Al—Si-alloy. The fluid transport element 5 shaped as a parallelepipedon is inserted in the composite material 1 preferably orthogonal to the longitudinal axis of the composite body 1 and has a plurality of holes indicated only. The fluid passes these holes flowing into or out of the tube-shaped composite body 1. The brazed-in fluid transport element 5 is in direct contact to the corrosion protective layer 3 and configured anodic against this corrosion protective layer 3 in order to improve the corrosion resistance. Insertion or brazing in of the fluid transport element 5 into the composite body is carried out before the brazing material layer 4 is applied to the corrosion protective layer 3 so that during melting the liquid braze material completely coats also the insertion place of the fluid transport element 5 of the composite body 1 in order to avoid any capillary action.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A composite material of a high-strength aluminium alloy, the composite material comprising:
   a core layer, a corrosion protective layer covering the top surface of the core layer, a brazing material layer applied to the corrosion protective layer,
   the core layer containing as alloying constituents 0.2 to 1.2% silicon Si; 0.8% maximum iron Fe; 0.15 to 1.0% copper Cu; 1.2% maximum manganese Mn; 1.2% maximum magnesium Mg; 0.04 to 0.35% chromium Cr; 0.2% maximum zinc; 0.25% maximum titanium Ti; and 0.3% maximum zirconium Zr with the balance being substantially aluminium Al;
   the corrosion protective layer containing as alloying constituents 0.6% maximum silicon Si; 0.7% iron Fe; 0.10 to 0.3% copper Cu; 0.9 to 1.5% maximum manganese Mn; 0.15% maximum magnesium Mg; 0.2% maximum chromium Cr; 0.2% maximum zinc; 0.30% maximum titanium Ti; and 0.3% maximum zirconium Zr with the balance being substantially aluminium Al; and
   the brazing material layer containing as alloying constituents 5% to 15% silicon Si; 0.8% maximum iron Fe; 0.3% maximum copper Cu, 0.1% maximum manganese Mn; 0.05% maximum magnesium Mg; 0.5% maximum zinc Zn; and 0.20% maximum titanium Ti with the balance being substantially aluminium Al.

2. The composite material of claim 1 wherein a plurality of tube-shaped composite materials are constructed to form a heat exchanger.

3. The composite material of claim 2 wherein the heat exchanger is provided with one or several anodic fluid transport elements, whereby there is a difference of the corrosion potential of 20 mV to 40 mV between the anodic fluid transport element and the cathodic corrosion protective layer.

4. The composite material of claim 2 wherein the heat exchanger is a $CO_2$ gas cooler.

5. The composite material of claim 1 wherein the brazing material layer has a lower melting point than the corrosion protective layer and the core layer.

6. The composite material of claim 1 wherein the thickness of the corrosion protective layer is between 5% and 20% of the thickness of the core layer.

7. The composite material of claim 1 wherein the thickness of the corrosion protection layer is between 5% and 15% of the thickness of the core layer.

8. The composite material of claim 1 wherein the composite material is plate shaped.

9. The composite material of claim 1 wherein the composite material is tube shaped.

10. Composite material of a high-strength aluminium alloy comprising:
    a core layer, a corrosion protective layer covering a top surface and a bottom surface of the core layer, and a brazing material layer (4) applied to the corrosion protective layer covering the top surface and the corrosion protective layer covering the bottom surface;
    the core layer containing as its alloying constituents 0.2 to 1.2% silicon Si; 0.8% maximum iron Fe; 0.15 to 1.0% copper Cu; 1.2% maximum manganese Mn; 1.2% maximum magnesium Mg; 0.04 to 0.35% chromium Cr; 0.2% maximum zinc; 0.25% maximum titanium Ti; and 0.3% maximum zirconium Zr with the balance being substantially aluminium Al;
    the corrosion protective layer containing as its alloying elements 0.6% maximum silicon Si; 0.7% iron Fe; 0.10 to 0.3% copper Cu; 0.9 to 1.5% maximum manganese Mn; 0.15% maximum magnesium Mg; 0.2% maximum chromium Cr; 0.2% maximum zinc; 0.30% maximum titanium Ti; and 0.3% maximum zirconium Zr with the balance being substantially aluminium Al; and
    the brazing material layer containing as its alloying elements 5% and 15% silicon Si; 0.8% maximum iron Fe; 0.3% maximum copper Cu, 0.1% maximum manganese Mn; 0.05% maximum magnesium Mg; 0.5% maximum zinc Zn; and 0.20% maximum titanium Ti with the balance being substantially aluminium Al.

11. The composite material of claim 10 wherein a plurality of tube-shaped composite materials are constructed to form a heat exchanger.

12. The composite material of claim 11 wherein the heat exchanger is provided with one or several anodic fluid transport elements, whereby there is a difference of the corrosion potential of 20 mV to 40 mV between the anodic fluid transport element and the cathodic corrosion protective layer.

13. The composite material of claim 10 wherein the brazing material layer has a lower melting point than the corrosion protective layer and the core layer.

14. The composite material of claim 10 wherein the thickness of the corrosion protective layer is between 5% and 20% of the core layer.

15. The composite material of claim 10 wherein the composite material is plate shaped.

16. The composite material of claim 10 wherein the composite material is tube shaped.

* * * * *